(No Model.)

L. K. STRANG.
EGG EXTRACTING OR SEPARATING DEVICE.

No. 451,684. Patented May 5, 1891.

Witnesses
A. J. Hanson.
O. E. Bartlett

Inventor
Leo K. Strang

UNITED STATES PATENT OFFICE.

LEW K. STRANG, OF HAVERHILL, MASSACHUSETTS, ASSIGNOR OF ONE-HALF TO JOHN D. WELDON, OF SAME PLACE.

EGG EXTRACTING OR SEPARATING DEVICE.

SPECIFICATION forming part of Letters Patent No. 451,684, dated May 5, 1891.

Application filed October 9, 1890. Serial No. 367,537. (No model.)

*To all whom it may concern:*

Be it known that I, LEW K. STRANG, of Haverhill, in the county of Essex and State of Massachusetts, have invented certain new and useful Improvements in Egg Extracting or Separating Devices, of which the following is a specification.

This invention has for its object to provide a simple and effective device for extracting or separating the white and yolk of an egg from its shell; and it consists in a wire arm of semi-oval form, adapted to enter and approximately fit the longitudinal curvature of one side of the interior of an egg-shell and provided with a handle, as I will now proceed to describe and claim.

Figure 1:
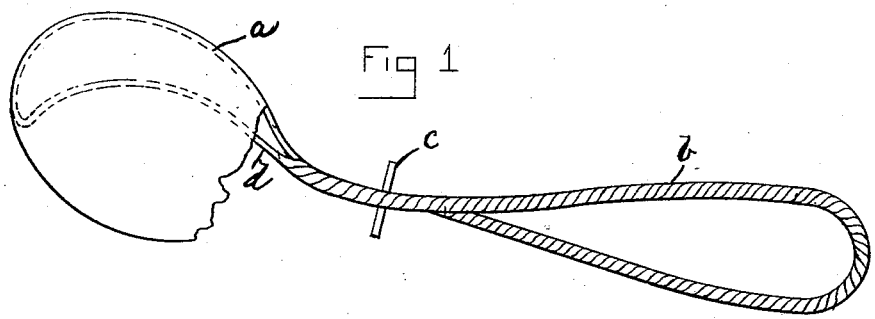
Figure 2:
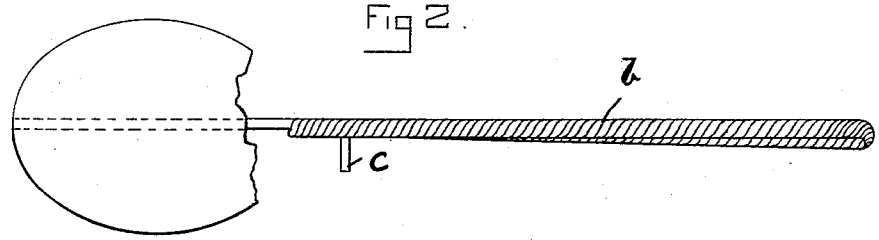
Figure 3:
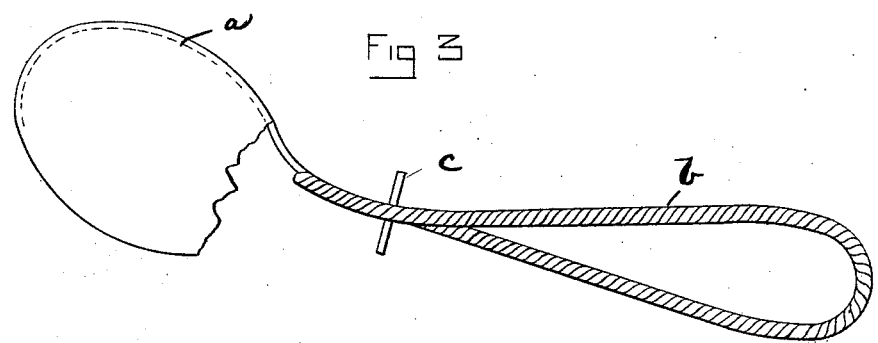

In the accompanying drawings, forming a part of this specification, Figure 1 represents a top view of my improved device. Fig. 2 represents a side view of the same, showing it resting on a table or other surface; and Fig. 3 represents a top view of another form of the device.

The same letters of reference indicate the same parts in all the figures.

In the drawings, $a$ represents a semi-oval arm, which is preferably made of wire, and is curved to conform approximately to the longitudinal curvature of one side of the interior of an egg-shell.

$b$ represents a handle, which is attached to the arm $a$, and $c$ represents a foot or rest, which is formed on the handle $d$, and which gives the device a support on a table or other surface on which it may be placed.

$d$ represents a brace, preferably of wire, which is attached to the outer end of the arm $a$ and at its other end to the handle $b$, said brace forming a strengthening-stay for the arm $a$.

I prefer to make the device of one piece of wire, as shown in the drawings, the handle $b$ consisting of two twisted strands of the wire, the foot $c$ being formed by a substantially triangular loop of one of said strands, the arm $a$ being a prolongation or extension of one strand of the handle, and the brace $d$ an extension or prolongation of the other, both being bent into the required shape and untwisted, as shown in Fig. 1.

In Fig. 3 I have shown another form of the device, the brace $d$ being omitted. In this case I also prefer to make the device of one piece of wire, the handle $b$ consisting of two twisted strands, as in the other form, with the foot $c$ formed of a loop of one strand, and the arm $a$ consisting of a prolongation or extension of one strand not twisted and bent to the required form. The end of the arm $a$ may be given a small eye or loop as a finish at the end of the wire.

In using the device part of one end of an egg-shell is broken off, and the arm $a$ is inserted in the orifice so formed and pushed into the egg until the farther end of the arm reaches the other end of the egg-shell. The egg is then rotated upon the arm and the arm withdrawn, when the contents of the egg will readily come away from the shell through the orifice made in the end thereof.

The foot or rest $c$ may be made of a loop of the wire, as described, or it may be made of a separate piece and then attached to the handle in any suitable way.

I may construct the device of any suitable material other than wire, and I may make the arm $a$ of one piece of material and set it in a handle of any other suitable material, and may make various changes without departing from the nature and spirit of my invention.

I am aware that a wire implement or scoop has been made of oval form, as shown in Patent No. 130,767. My device is distinguished from said scoop by the fact that it constitutes only a half-oval and is formed to bear on only one side of the interior of an egg-shell at a time, whereas the scoop if inserted in an egg-shell would bear on both sides of the interior thereof. Hence the scoop if formed to fit the inside curvature of the egg-shell would require to be made so wide that fully one-half of the egg-shell would have to be broken away to permit its entrance.

My improved device, constituting a half or one side of an oval, can be inserted in a comparatively small opening in one end of the shell.

I claim—

1. An egg extracting or separating device consisting of a semi-oval arm or wire adapted to enter a small aperture at one end of an egg and curved to approximately fit the longitudinal curvature of one side of the interior of an egg-shell, and a handle secured to one end of said arm, as set forth.

2. The improved egg extracting or separating device comprising the handle, the semi-oval arm curved to fit the interior of one side of an egg-shell and adapted to enter a small aperture in one end of an egg, and the foot or rest secured to the handle and adapted to support the arm above the table on which the device rests, as set forth.

In testimony whereof I have signed my name to this specification, in the presence of two subscribing witnesses, this 22d day of September, A. D. 1890.

LEW K. STRANG.

Witnesses:
 ANDRÉ STONE,
 FRANCIS H. PEARL.